United States Patent [19]
Bajric et al.

[11] Patent Number: 5,631,507
[45] Date of Patent: May 20, 1997

[54] ELECTRIC POWER GENERATOR

[75] Inventors: Suad Bajric, Etobicoke; Alp Batur; Bora Batur, both of Mississauga; Dominic Burns, Whitby; John F. Faulkner; Ljubisa Sandovski, both of Brampton; Rene Sonnenschein, Whitby; Howard N. Stanleigh, Thornhill, all of Canada

[73] Assignee: Berent Light Limited, Mississauga, Canada

[21] Appl. No.: 588,849

[22] Filed: Jan. 19, 1996

[51] Int. Cl.$^6$ .................... H02K 11/00; H02K 7/06; H02K 35/02
[52] U.S. Cl. .................... 310/67 A; 310/20; 322/3
[58] Field of Search .................... 310/20, 23, 67 A, 310/75 R, 80, 15; 322/3

[56] References Cited

U.S. PATENT DOCUMENTS

| | | | |
|---|---|---|---|
| 1,307,343 | 6/1919 | Brown | 310/15 |
| 2,461,121 | 2/1949 | Markham | 417/273 |
| 2,627,041 | 1/1953 | Phelon | 310/74 |
| 2,769,909 | 11/1956 | Radmacher | 322/3 |
| 2,870,350 | 4/1959 | Olson | 310/27 |
| 2,921,252 | 1/1960 | Schiavone | 322/3 |
| 3,206,609 | 9/1965 | Dawes | 290/1 |
| 3,681,631 | 8/1972 | Haener | 310/37 |
| 4,298,910 | 11/1981 | Price | 310/73 |
| 4,775,919 | 10/1988 | Pearsall et al. | 310/67 A |
| 4,893,877 | 1/1990 | Powell et al. | 310/67 A |
| 5,077,515 | 12/1991 | St. Arnauld | 310/23 |
| 5,347,186 | 9/1994 | Konotchick | 310/17 |

*Primary Examiner*—Clayton E. Laballe
*Attorney, Agent, or Firm*—Arne I. Fors; Dale E. Schlosser; John R. Rudolph

[57] ABSTRACT

An electric power generator has a housing having an inner cavity having a center and an inner circumferential surface spaced at a varying radial extent from the center. A magnetic flux generator has a body offset from a point of rotation. The magnetic flux generator is rotatable at the center. The magnetic flux generator has a central passageway for slidably receiving a shaft with a magnet. The magnetic flux generator has a coil mounted about the central passageway in an inductive relation with the magnet. A spring is disposed between the shaft and magnetic flux generator for urging the shaft into contact with the inner circumferential surface whereby as the housing rotates, the magnetic flux generator rotates relative to the housing urging the shaft to travel along the inner circumferential surface causing relative back and forth motion of the shaft through the passageway inducing a voltage in the coil.

17 Claims, 2 Drawing Sheets

ELECTRIC POWER GENERATOR

FIELD OF THE INVENTION

This invention relates to an electric power generator. In particular, this invention relates to a device which when rotated generates a current for powering low voltage lighting devices typically used on a bicycle.

BACKGROUND OF THE INVENTION

Generators produce electric current through the interaction of a magnet and a coil. When a magnet is moved through a coil, it will change the magnet flux in the coil to induce a voltage in the coil.

U.S. Pat. No. 5,347,186, which issued Sep. 13, 1994 to Konotchick, discloses an electric power generator having two magnets which oppose each other. One magnet is positioned above the other magnet and is attached to a platform. The positioning of the magnets in this fashion causes the first magnet to float above the second magnet. As force is applied to the platform, it and the first magnet pass through coils of wire to produce a magnet flux. An external force is necessary to cause movement of the first magnet. In one embodiment, shaking of the device causes movement of magnets to produce a voltage.

Light emitting diodes can be electrically coupled to a coil. The light emitting diodes emit light responsive to a current generated in the coil. U.S. Pat. No. 4,775,919 which issued Oct. 4, 1988 to Pearsall et al. discloses a wheel cover which has lights around the circumference of a housing within the wheel cover. Coils are mounted about a first housing. A second housing which contains magnets is mounted within the first housing. Current is produced as the magnets are rotated within the first housing. This current energizes the light emitting diodes.

The electric power generators of the prior art generally require high rotational speed for current generation. Such devices are thus unsuitable for use with bicycles or other self-propelled vehicles.

Further, electric power generators of the prior art are not self contained requiring complicated installation procedures.

SUMMARY OF THE INVENTION

The disadvantages of the prior art may be substantially overcome by providing a low speed electric power generator which is self contained.

The electric power generator of the present invention is a self contained unit, allowing the unit to be attached for rotation. The housing of the electric power generator may be rotated by attaching the unit to a rotating body to provide the rotational movement required for operation of the present invention.

In its broad aspect, the electric power generator of the present invention has a magnetic flux generator contained within a rotatable housing. The housing has an inner cavity. The inner cavity has a center and an inner circumferential surface spaced at a varying radial extent from the center of the cavity. The magnetic flux generator has a body offset from a mounting bracket. The mounting bracket rotatably mounts the magnetic flux generator at the center. The body of the magnetic flux generator has a central passageway for slidably receiving a shaft having a magnet. The body of the magnetic flux generator has a coil mounted about the central passageway in an inductive relation with the magnet. Springs are disposed between the shaft and the body biasing the shaft into contact with the inner circumferential surface.

As the housing rotates, the magnetic flux generator rotates relative to the housing urging the shaft to travel along the inner circumferential surface causing relative reciprocating motion of the shaft through the passage. This motion induces an electric current in the coil.

BRIEF DESCRIPTION OF THE DRAWINGS

The present invention will now be described with reference to the accompanying drawings, in which.

DETAILED DESCRIPTION OF THE PREFERRED EMBODIMENTS

Figure 1:
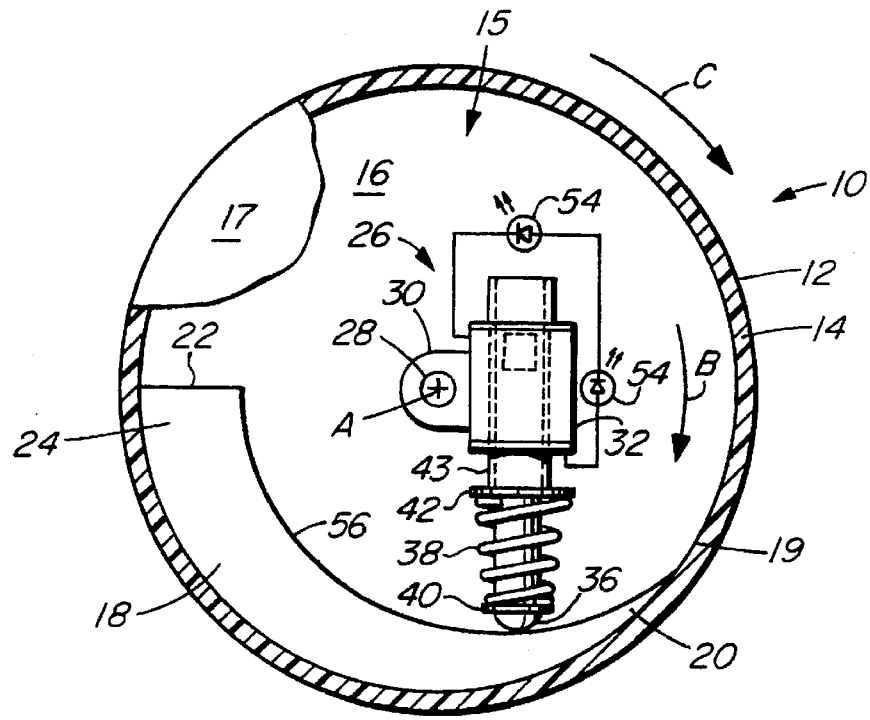
FIG. 1 is a cross-sectional side elevational view of the electric power generator of the present invention.

Referring to FIG. 1, the electric power generator of the present invention is depicted as numeral 10. The electric power generator 10 has a substantially disc-shaped housing 12, preferably made of plastic. The housing 12 has an annular rim 14 defining a cavity 15 between a clear plastic back plate 16 and a clear plastic front cover plate 17. The housing 12 is rotatably mounted to an object such as a bicycle wheel.

The housing 12 has a cam 18 on the circumferential surface 19 of cavity 15. The cam 18 has a thin end 20 smoothly merging with the circumferential surface 19. The cam 18 progressively widens towards edge 22 of end section 24 which is the thickest part of the cam 18. The cam 18 extends approximately one-third of the circumference of rim 14 in the preferred embodiment but could be any suitable size or configuration provided a reciprocating motion as described below is achieved.

The magnetic flux generator 26 of the electric power generator 10 is rotatably affixed to the back plate 16 of the housing 12 by screw 28. Screw 28 inserted through an aperture in bracket 30 to engage back plate 16 to rotatably retain the magnetic flux generator 26 within the housing 12. The magnetic flux generator 26 has an axis of rotation concentric with the center of the housing 12. The magnetic flux generator 26 rotates within the housing 12 about axis A. The center of mass of the magnetic flux generator 26 is eccentric to axis A.

The magnetic flux generator 26 comprises a rectangular box-shaped body 32, which is offset from the axis of rotation A by bracket 30. Body 32 has an axial passageway 34 (FIG. 2), which slidingly receives a shaft 36.

Shaft 36 has a flange 40 at a remote end thereof. Sleeve 43 is connected to body 32 as an extension of passageway 34. Flange 42 is at the end of sleeve 43. Spring 38 is mounted between flanges 40 and 42 to urge shaft 36 away from body 32 to bias shaft 36 to contact with the inner circumferential surface 19 and cam 18. The compression strength of spring 38 cannot exceed the weight of the magnetic flux generator 26. Spring 38 must allow the magnetic flux generator to rotate freely about axis A.

Figure 2:
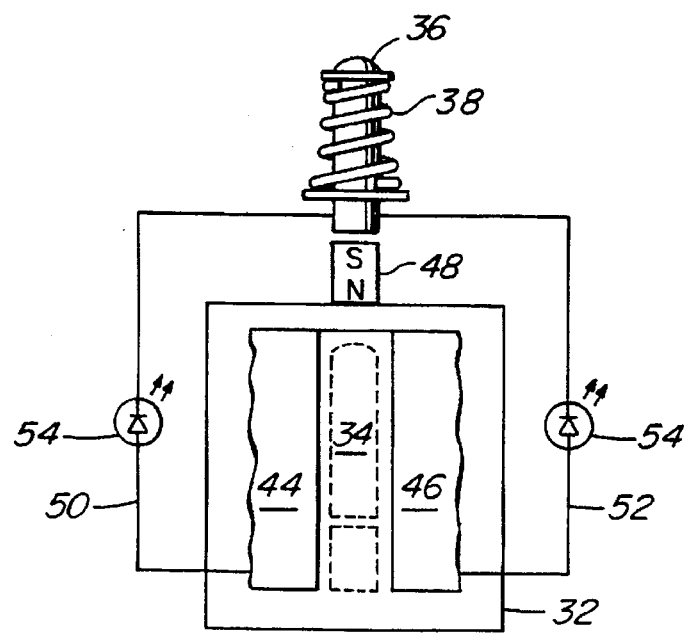
FIG. 2 is a top plan view of the magnetic flux generator of the electric power generator of the embodiment of FIG. 1.

FIG. 2 shows the magnetic flux generator 26 in further detail. Mounted on either side of the axial passageway 34 within the body 32 are two coils 44 and 46, which are electrically connected together. Optionally, a single coil may be used which has a central axial passageway. A magnet 48 is affixed to the end of shaft 36 for reciprocal travel through the body 32. Magnet 48 is in an inductive relation with the coils 44 and 46 in that reciprocal travel of magnet 48 through coils 44 and 46 will induce a voltage in the coils. Leads 50 and 52 are electrically connected to coils 44 and 46 respectively. The leads 50 and 52 are connected to two light emitting diodes 54 in series. The light emitting diodes 54 are attached to the magnetic flux generator proximate the top of body 32 facing in opposite directions to be easily seen from either the front or back of the housing.

Optionally, magnet 48 could be integrated with shaft 36.

FIG. 2 shows the magnetic flux generator 26 in extended position. Ghost lines show the magnetic flux generator 26 in a retracted position. When the shaft 36 and the magnet 48 reciprocally travel through passageway 34 between the coils 44 and 46, a voltage is induced in the coils 44 and 46 due to a change in magnet flux. The resulting current induced in coils 44 and 46 flows through leads 50 and 52 to the light emitting diodes 54 for the production of light.

Operation

Operation of the magnetic flux generator 26 to produce light will be described with reference to FIGS. 1 and 2.

In operation, the housing 12, for example, is mounted on the spokes of a bicycle wheel and can be rotated in the direction shown by arrow C in FIG. 1. Since magnetic flux generator 26 is rotatably mounted by screw 28 within the housing 12, the rotation of housing 12 causes relative rotation of the magnetic flux generator 26 about axis A in the direction shown by arrow B. The light emitting diodes are located on the magnetic flux generator 26 to increase the mass of the magnetic flux generator 26 to aid its rotation.

The distal end of shaft 36 will travel along the circumferential surface 19 of rim 14 and cam 18. The changing radial extent of cam 18 along concave edge 56 reciprocally moves the shaft 36 from the extended position as shown in FIG. 2 into passageway 34 between the coils 44 and 46 to the retracted position as shown by ghost lines in FIG. 2.

As the magnetic flux generator 26 rotates in the direction shown by arrow B, the shaft 36 moves past the end section 24 of the cam 18 and edge 22 and the spring 38 urges the shaft 36 into the extended position. The movement of the magnet 48 between the extended position and the retracted position between the coils 44 and 46 induces a voltage in the coils 44 and 46. The resulting current generated in coils 44 and 46 flows through leads 50 and 52 to energize the light emitting diode 54 to produce a flicker of light. In this manner, an intermittent light is produced. As the rotation of the magnetic flux generator 26 increases, the flicker of light will be produced more frequently giving the effect of a continuous light.

The electric power generator of the present invention provides a number of important advantages.

The housing allows the electric power generator to be used at various locations and on various apparatus. For example, the electric power generator may be used to power a safety light on a bicycle. The electric power generator may be rotatably mounted to a bicycle wheel. As the wheel rotates, the electric power generator rotates thereby causing the magnetic flux generator to rotate producing current to energize a LED to emit light.

The electric power generator of the present invention has the advantage of not requiring external electrical power such as a battery to power the actuation of the magnetic flux generator.

Figure 3:
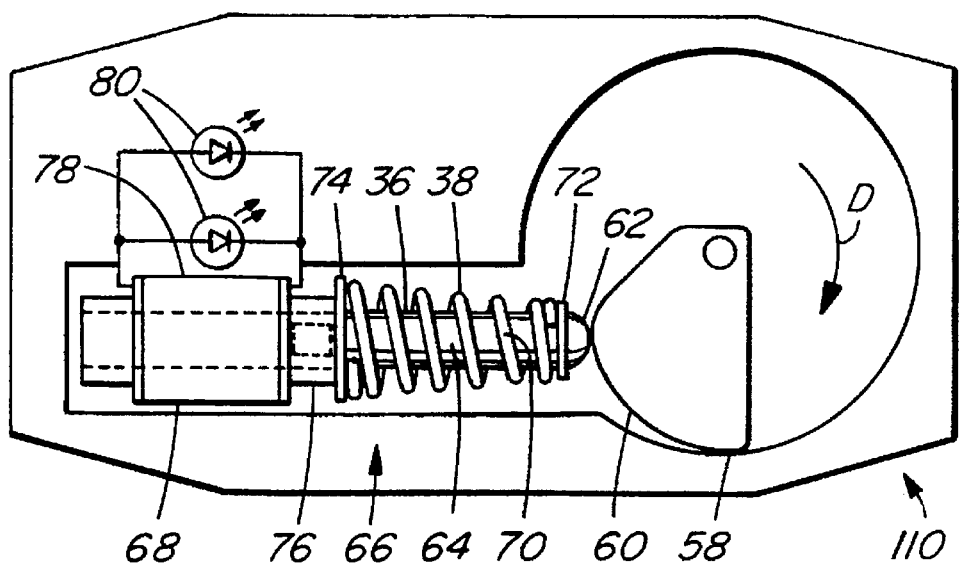
FIG. 3 is a cross-sectional side elevational view of a second embodiment of the present invention.
Figure 4:
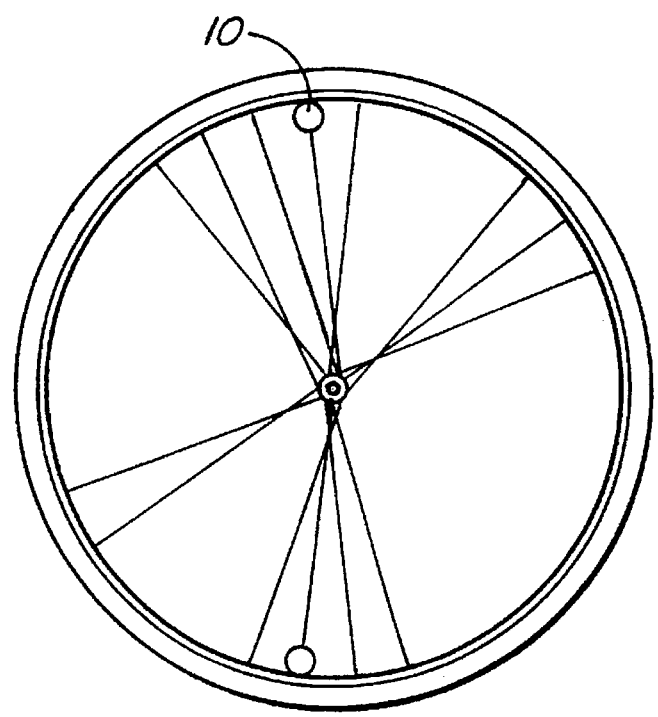
FIG. 4 is a side elevational view of the electric power generator of FIG. 1 located on a bicycle wheel.

FIG. 3 shows another embodiment of the electric power generator 10 of the present invention. The electric power generator 110 has a cam 58 which is rotatably mounted in the housing. The cam 58 has a contoured outer surface 60 which smoothly engages the distal end 62 of the shaft 64 of a magnetic flux generator 66 which has the same construction of the magnetic flux generator discussed above.

The magnetic flux generator 66 of the electric power generator 110 is relatively stationary. The housing 68 of the magnetic flux generator 66 has an axial passageway which slidably receives the shaft 64. Spring 70 engages flange 72 which is affixed to the shaft 64 at a remote end thereof. Flange 74 is mounted at the end of sleeve 76 of the housing 78 of the magnetic flux generator 66.

The compression strength of spring 70 must not exceed the weight of the cam 58.

As the electric power generator 110 is rotated, the cam 58 will contact the distal end 62 of the shaft 64 forcing the shaft 64 into a passageway within the magnetic flux generator 66. The shaft 64 is moved from an extended position to a retracted position as discussed below to induce a current flow to light emitting diodes 80. Once the cam 58 passes the distal end, spring 70 urges the shaft 64 back to its extended position.

It will be understood, of course, that modifications can be made in the embodiments of the invention described herein without departing from the scope and purview of the invention as described by the appended claims.

We claim:

1. An electric power generator comprising:
   a housing having an inner cavity having a center and an inner circumferential surface spaced at a varying radial extent from said center;
   a magnetic flux generator rotatably mounted eccentrically to said housing at said center, said magnetic flux generator having a central passageway for slidably receiving a shaft having a magnet, said magnetic flux generator having a coil mounted about the central passageway in an inductive relation with said magnet;
   a biasing means between said shaft and magnetic flux generator for urging the shaft into contact with said inner circumferential surface whereby as said housing rotates, said magnetic flux generator rotates relative to said housing urging said shaft to travel along said inner circumferential surface causing relative reciprocating motion of said shaft through said passageway inducing a voltage in said coil.

2. An electric power generator as claimed in claim 1 wherein said circumferential surface has a cam presenting said varying the radial extent.

3. An electric power generator as claimed in claim 2 wherein said cam extends about one-third of the circumference of the said inner circumferential surface.

4. An electric power generator as claimed in claim 1 wherein said housing comprises a back plate, a front cover and an annular rim between said back plate and said front cover.

5. An electric power generator as claimed in claim 1 wherein said biasing means is a compression spring.

6. An electric power generator as claimed in claim 5 wherein said shaft has a flange for retaining said compression spring.

7. An electric power generator as claimed in claim 1 additionally comprising signal means electrically coupled to said coil for generating a signal.

8. An electric power generator as claimed in claim 7 wherein said signal means are light emitting diodes.

9. An electric power generator comprising:

a housing having an inner cavity having a center and an inner circumferential surface spaced at a varying radial extent from said center;

a magnetic flux generator rotatably mounted eccentrically at said center, said magnetic flux generator having a central passageway for slidably receiving a shaft having a magnet, said magnetic flux generator having a plurality of coils mounted about the central passageway in an inductive relation with said magnet;

a biasing means between said shaft and body for urging the shaft into contact with said inner circumferential surface whereby as said housing rotates, said magnetic flux generator rotates relative to said housing urging said shaft to travel along said inner circumferential surface causing relative reciprocating motion of said shaft through said passageway inducing a voltage in said coil.

10. An electric power generator as claimed in claim 9 wherein said circumferential surface has a cam presenting said varying the radial extent.

11. An electric power generator as claimed in claim 10 wherein said cam extends about one-third of the circumference of the said inner circumferential surface.

12. An electric power generator as claimed in claim 11 wherein said housing comprises a back plate, a front cover and an annular rim between said back plate and said front cover.

13. An electric power generator as claimed in claim 12 additionally comprising signal means electrically coupled to said coil for generating a signal responsive to the current generated by the reciprocating motion of said shaft through said passage.

14. An electric power generator as claimed in claim 13 wherein said signal means are light emitting diodes.

15. An electric power generator comprising:

a housing having an inner cavity having a center;

a magnetic flux generator mounted offset from said center, said magnetic flux generator having a central passageway for slidably receiving a shaft having a magnet, said magnetic flux generator having a coil mounted about the central passageway in an inductive relation with said magnet;

a cam rotatably mounted at said center, said cam having an outer circumferential surface at a varying radial extent from said center;

a biasing means between said shaft and magnetic flux generator for urging the shaft into contact with said cam whereby as said housing rotates, said cam rotates relative to said housing urging said shaft to reciprocate through said passageway inducing a voltage in said coil.

16. An electric power generator as claimed in claim 15 additionally comprising signal means electrically coupled to said coil for generating a signal.

17. An electric power generator as claimed in claim 16 wherein said signal means are light emitting diodes.

* * * * *